(12) United States Patent
Burgdörfer et al.

(10) Patent No.: US 8,545,953 B2
(45) Date of Patent: Oct. 1, 2013

(54) HOLLOW POLYSTYRENE BODY OBTAINED BY INJECTION STRETCH BLOW MOULDING

(75) Inventors: Stefan Burgdörfer, Mutterstadt (DE); Walter Heckmann, Weinheim (DE); Hans-Jürgen Renner, Neuhofen (DE); Christian Schade, Ludwigshafen (DE); Hans-Dieter Schwaben, Rhodt (DE)

(73) Assignee: Styrolution GmbH (DE)

( * ) Notice: Subject to any disclaimer, the term of this patent is extended or adjusted under 35 U.S.C. 154(b) by 835 days.

(21) Appl. No.: 12/527,975

(22) PCT Filed: Dec. 17, 2007

(86) PCT No.: PCT/EP2007/064096
§ 371 (c)(1),
(2), (4) Date: Aug. 20, 2009

(87) PCT Pub. No.: WO2008/040821
PCT Pub. Date: Apr. 10, 2008

(65) Prior Publication Data
US 2010/0080874 A1 Apr. 1, 2010

(30) Foreign Application Priority Data

Feb. 28, 2007 (EP) .................... 07103233

(51) Int. Cl.
*B32B 1/02* (2006.01)
*B32B 1/08* (2006.01)
*B65B 25/06* (2006.01)
*B29C 49/08* (2006.01)

(52) U.S. Cl.
USPC ....... 428/36.4; 428/34.9; 428/35.1; 428/35.7; 428/36.8; 428/36.9; 428/36.91; 428/36.92; 264/529; 264/537; 426/397

(58) Field of Classification Search
USPC ................... 428/34.1, 34.9, 35.1, 35.7, 36.4, 428/36.6–36.92; 264/529, 537; 426/397
See application file for complete search history.

(56) References Cited

U.S. PATENT DOCUMENTS

| | | | |
|---|---|---|---|
| 3,536,500 A | 10/1970 | Cleerman et al. | |
| 4,094,406 A * | 6/1978 | Zietzschmann | 206/432 |
| 4,480,979 A | 11/1984 | Keith et al. | |
| 4,900,786 A * | 2/1990 | Abolins et al. | 525/68 |
| 5,068,078 A | 11/1991 | Hill et al. | |
| 6,376,095 B1 | 4/2002 | Cheung et al. | |
| 6,521,712 B1 | 2/2003 | Knoll et al. | |
| 6,579,946 B2 | 6/2003 | Chau | |
| 6,585,125 B1 | 7/2003 | Peek | |
| 6,593,430 B1 | 7/2003 | Knoll et al. | |
| 6,914,091 B2 * | 7/2005 | Donald et al. | 524/156 |
| 2003/0039779 A1 | 2/2003 | Share et al. | |
| 2008/0269414 A1 | 10/2008 | Knoll et al. | |
| 2008/0287643 A1 | 11/2008 | Strauch et al. | |

FOREIGN PATENT DOCUMENTS

| | | |
|---|---|---|
| DE | 60202135 T2 | 12/2005 |
| EP | 1157806 A1 | 11/2001 |
| GB | 1472195 | 5/1977 |
| JP | 2005145560 A | 6/2005 |
| JP | 2005225960 A | 8/2005 |
| WO | WO-0058380 A1 | 10/2000 |
| WO | WO-2006074819 A1 | 7/2006 |
| WO | WO-2007048728 A1 | 5/2007 |

* cited by examiner

*Primary Examiner* — Walter B Aughenbaugh
(74) *Attorney, Agent, or Firm* — Novak Druce Connolly Bove + Quigg LLP

(57) ABSTRACT

A blow molding having capacity of at least 250 ml, having a shell which is composed of impact-resistant polystyrene and which is produced via injection stretch blow molding where an average aspect ratio of rubber particles derived from longitudinal section and an average aspect ratio of rubber particles derived from cross section measured in transmission electron micrographs is greater than 4 respectively, and a biaxial orientation of the rubber particles, given by the ratio of the aspect ratio derived from cross section to the aspect ratio derived from longitudinal section is smaller than 3.

10 Claims, No Drawings

HOLLOW POLYSTYRENE BODY OBTAINED BY INJECTION STRETCH BLOW MOULDING

CROSS-REFERENCE TO RELATED APPLICATIONS

This application is a national stage application (under 35 U.S.C. §371) of PCT/EP2007/064069, filed Dec. 17, 2007, which claims benefit of European application 07103233.8, filed Feb. 28, 2007.

BACKGROUND OF THE INVENTION

The invention relates to a blow molding having capacity of at least 250 ml, its shell being composed of polystyrene and being produced via injection stretch blow molding.

The invention further relates to the process for production of this blow molding and to the use of the blow moldings.

Polystyrene is rubber-free or rubber-containing polystyrene, styrene-butadiene copolymers, and also mixtures composed of the polymers and/or of block copolymers.

Rubber-free polystyrene is also termed GPPS (general purpose polystyrene).

Conventional rubber-containing styrene polymers comprise a rubber phase which is based on dienes and which has been dispersed in a hard matrix composed of styrene polymer. Impact-resistant polystyrene (HIPS, high impact polystyrene) thus comprises a hard polystyrene matrix and, dispersed therein, polybutadiene rubber particles, for example. It is obtained by first preparing a rubber—e.g. in solution—and dissolving the rubber in styrene, and then polymerizing the mixture to give the HIPS.

The term polystyrene also includes styrene-butadiene block copolymers.

Production of relatively small blow moldings via blow molding of polystyrene is known but is very little used. Examples are the 65 ml drinking-yoghurt containers from Yakult or 200 ml yoghurt pots with trade mark Landliebe® from the dairy company Campina. However, these blow moldings have a low blow-up ratio. Exposure to mechanical load can cause destruction of these containers through breakage resulting from splitting. Vessels with relatively high capacity which are safe to transport cannot be produced by this technique. The tendency of a vessel to split when dropped from a height of 1 meter, for example, rises extremely rapidly with volume/weight of contents.

JP 2005-145560 describes drinks containers obtainable via injection blow molding. The containers are produced with an impact-resistant polystyrene whose residual content of styrene is less than 100 ppm and whose total content of volatile organic substances is less than 150 ppm, which is prepared via an extraction process from polystyrenes whose residual contents are higher. The capacity of the molded containers is 138 ml. Articles having less than 1% rubber content cease to have desirable organoleptic properties.

JP 2005-225960 proposes using extrusion blow molding processes for production of relatively large containers, such as bath tubs. Here, high-molecular-weight HIPS whose average molecular weight is from 250 to 300 000 daltons and which have defined molar mass distribution are converted to blow moldings. The extrusion blow molding process is not suitable for production of blow moldings such as bottles, which have very precise geometries—in particular in the region of the screw thread and the closure of the blow moldings. The abovementioned high-molecular-weight HIPS has too little flowability for other processes, such as injection blow molding, and cannot therefore be used for this process.

For this reason, relatively large blow moldings, such as bottles, have hitherto been produced from other materials, in particular PET, PP, PVC, or PC. Production processes that have been developed for these articles are particularly injection blow molding and injection stretch blow molding. http://en.wikipedia.org/wiki/Blow_molding has information on injection blow molding and injection stretch blow molding.

The PET bottle, successful in the drinks sector, is less suitable as a container for dairy products which comprise living cultures, e.g. yoghurt, kefir, whey, etc. Other materials which have relatively high permeability to oxygen or carbon dioxide have unsatisfactory splitting behavior. Because these materials have hitherto provided insufficient safety during transport, they have hitherto been very little used as containers for hazardous products, such as corrosive liquids. Chemical resistance to materials such as strong bases is also inadequate.

BRIEF SUMMARY OF THE INVENTION

The object of the present invention then consisted in developing high-performance bottles whose volume is greater than 250 ml particularly for the abovementioned applications.

Surprisingly, it has now been found that the blow moldings mentioned in the introduction with capacity of at least 250 ml whose shells are composed of polystyrene and which have been produced via injection stretch blow molding meet the abovementioned requirements. In comparison with PET bottles, up to 25% weight saving is possible without any significant impairment of the properties of the bottle. This considerably reduces transport costs. Furthermore, substantially lower blowing pressures are needed for production of the inventive blow moldings, and this leads to lower apparatus cost and savings in the production process.

DETAILED DESCRIPTION OF THE INVENTION

Materials preferably suitable for production of the inventive blow moldings are SAN and in particular polystyrene (GPPS) and impact-resistant polystyrene (HIPS).

The molecular weight of HIPS is preferably from 150 000 to 240 000 daltons, and its flowability is preferably from 2 to 20 ml/10 min, measured at 200° C./5 kg to ISO 1133, and its rubber content is preferably from 0.2 to 10%, and its residual styrene content is preferably less than 500 ppm, particularly preferably less than 250 ppm.

A particular formulation uses HIPS grades whose sulfur content is below 30 ppm, preferably below 10 ppm. The inventive process thus permits, for the first time, provision of blow moldings with a shell composed of impact-resistant polystyrene with this low sulfur content. Accordingly, one particular embodiment of the present invention is a blow molding obtainable by means of injection stretch blow molding from HIPS whose sulfur content is below 30 ppm, preferably below 10 ppm.

The injection stretch blow moldings composed of impact-resistant polystyrene have biaxial orientation of the rubber particles. The degree of orientation of the rubber particles can be determined via the aspect ratio of the particles by means of transmission electron micrographs. The degree of biaxial character is found by comparing the aspect ratios of cross-sectioned and longitudinal sectioned specimens. In a typical section of the sidewall, the quotients calculated from the average aspect ratios from cross section and longitudinal sectioned should be smaller than 3, preferably smaller than 2, very particularly preferably smaller than 1.5. Accordingly, the present invention also comprises blow moldings obtainable by means of injection stretch blow molding where the average aspect ratio of longitudinal section and cross section measured in transmission electron micrographs for the biaxial orientation of the HIPS rubber particles is smaller than 3, preferably smaller than 2, very particularly preferably smaller than 1.5.

The average longitudinal aspect ratio of the blow moldings produced via injection stretch blow molding contrasts with that of unoriented specimens, generally being greater than 4, preferably greater than 7, and very particularly preferably greater than 10. The transverse aspect ratios have similarly high values, the values for longitudinal to transverse ratio (biaxial character) therefore being small, as mentioned above.

The average molecular weight of GPPS is preferably from 150 000 to 350 000 daltons, and its flowability is preferably from 1 to 20 ml/10 min, measured at 200° C./5 kg to ISO 1133, and its residual styrene content is preferably below 500 ppm, particularly preferably below 300 ppm.

Examples of styrene-butadiene block copolymers X0 that can be used are the block copolymers described in WO 06/074819.

A star-block copolymer X1 (26% by weight of butadiene, 74% by weight of styrene) having random copolymer blocks B/S was prepared via sequential anionic polymerization of styrene and butadiene followed by coupling with epoxidized linseed oil as in example 15 of WO 00/58380.

The block copolymer mixtures X2 were prepared by following the instructions in WO 06/074819 via sequential anionic polymerization with double initiator metering (sec.-butyl lithium) in stage 1 or 2 at solids content of about 30% by weight in cyclohexane at temperatures in the range from 50 to 800 C. After the polymerization had ended, isopropanol was used for termination and the mixture was acidified with $CO_2$/water. The polymerization was carried out in the presence of potassium tert-amyl alcoholate at a molar lithium/potassium ratio of 38/1, in order to obtain a random S/B copolymer block. The block copolymers were freed from solvent in a vented extruder.

The block copolymer mixtures obtained comprise block copolymers having random copolymer blocks of structure (I) S1-(B/S)a-(B/S)b-S2 with number-average molar mass of about 150 000 g/mol and of structure (II) (B/S)a-(B/S)b-S3 with number-average molar mass of about 75 000 g/mol, in a molar ratio (I)/(II) corresponding to the initiator ratio I1/I2.

Styrene-acrylonitrile copolymers ("SAN"), and also processes for their production, are known to the person skilled in the art and are described in the literature, for example in Ullmann's Encyclopedia of Industrial Chemistry, Wiley-VCh Verlag GmbH & Co. KgaA, Weinheim, 7th edition 2007, chapter on "Polystyrene and Styrene Copolymers".

Preferred SANs, component B, are obtainable via reaction of
from 60 to 99% by weight, preferably from 60 to 85% by weight, particularly preferably from 64 to 82% by weight, of component b1,
from 1 to 40% by weight, preferably from 15 to 40% by weight, particularly preferably from 18 to 36% by weight, of component b2, and
from 0 to 40% by weight, preferably from 0 to 25% by weight, particularly preferably from 0 to 17% by weight, of component b3 (each of the % by weight values being based on the weight of component B).

The component b1 used comprises styrene, α-methylstyrene, or a mixture of said compounds, styrene being preferred.

Component b2 is acrylonitrile.

In principle, any of the unsaturated monomers that differ from components b1 and b2 can be used as component b3.

Preferred component B is styrene-acrylonitrile, poly-α-methylstyrene-acrylonitrile, or a mixture of these.

The SANs can be produced by processes known per se, examples being bulk polymerization, solution polymerization, suspension polymerization, or emulsion polymerization, preference being given to solution polymerization (see GB-A 14 72 195). Preference is given here to SANs with molar masses $M_w$ of from 60 000 to 300 000 g/mol, determined via light scattering in dimethylformamide. In one preferred embodiment, SAN is isolated after production by processes known to the person skilled in the art, and preferably processed to give pellets.

The molding compositions used for the production of the inventive bottles can comprise conventional processing aids, such as stabilizers, oxidation retarders, agents to counteract decomposition by heat and decomposition by ultraviolet light, lubricants and mold-release agents, colorants, such as dyes and pigments, nucleating agents, plasticizers, and compatibilizers.

Examples that may be mentioned of oxidation retarders and heat stabilizers are sterically hindered phenols and/or phosphites, hydroquinones, aromatic secondary amines, such as diphenylamines, various substituted representatives of these groups, and mixtures of these, in concentrations up to 1% by weight, based on the weight of the thermoplastic molding compositions.

UV stabilizers that may be mentioned, the amounts of these used generally being up to 2% by weight, based on the molding composition, are various substituted resorcinols, salicylates, benzotriazoles, and benzophenones.

Colorants that can be added are inorganic pigments, such as titanium dioxide, ultramarine blue, iron oxide, and carbon black, and also organic pigments, such as phthalocyanines, quinacridones, perylenes, and also dyes, such as nigrosin and anthraquinones. It is particularly advantageous that white-pigmented, and in particular titanium-dioxide-pigmented, polystyrene or SAN molding compositions are used in the blow moldings. These have relatively high scratch resistance.

Nucleating agents that can be used are sodium phenylphosphinate, aluminum oxide, silicon dioxide, and also preferably talc.

The amounts used of further lubricants and mold-release agents are usually up to 1% by weight. Preference is given to long-chain fatty acids (e.g. stearic acid or behenic acid), their salts (e.g. Ca stearate or Zn stearate), or montan waxes (mixtures composed of straight-chain, saturated carboxylic acids having chain lengths of from 28 to 32 carbon atoms), and also Ca montanate or Na montanate, and also low-molecular-weight polyethylene waxes and low-molecular-weight polypropylene waxes.

Examples that may be mentioned of plasticizers are dioctyl phthalate, dibenzyl phthalate, butyl benzyl phthalate, hydrocarbon oils, and N-(n-butyl)benzene-sulfonamide.

The injection stretch blow molding process described in the literature mentioned in the introduction is used for production of the blow moldings. To this end, i) pellets composed of polystyrene or SAN are melted and injection molded to give a parison. The resultant parison is then ii) transferred to a second mold where it is stretched and blown.

A blowing pressure which has proven advantageous for production of bottles is not more than 15 bar, preferably not more than 10 bar, and very particularly preferably not more than 5 bar. SAN and polystyrene can consequently be processed at substantially lower pressures than the PET usually used.

Prestretch speed is usually from 0.1 to 2 m/s, preferably from 0.2 to 1 m/s.

The pellets are usually injected molded at temperatures of from 200 to 260° C. These vessels are obtained via injection molding below 280° C., preferably below 260° C., very particularly preferably below 240° C. The melt can also be processed by injection molding with substantial exclusion of oxygen, for example by covering the pellets with a stream of nitrogen in the intake region of the injection molding machine.

Blowing is then carried out from 110 to 190° C. In the case of HIPS, the processing temperature is preferably in the range from 120 to 145° C.

For production of bottles whose residual aldehyde content is below 10 ppm, it has proven advantageous to select mild processing conditions in particular during injection molding. In these cases it is preferable to operate with exclusion of oxygen, for example under nitrogen.

It is also possible to add substances known from the literature which have a binding effect that removes some or all of the aldehydes, examples being zeolites, or the aldehyde scavengers used for other materials (e.g. polyesters), or hydrophobicized sugar derivatives, etc.

The inventive process permits inter alia production of bottles composed of HIPS with high stiffness. The moduli of elasticity of sections of the sidewall of the inventive moldings are greater by at least 10%, preferably by at least 20%, very particularly preferably by more than 25%, than the moduli determined on the same material under standard conditions. The degree of biaxial orientation was determined by using a TEM preparation firstly parallel to the axial direction (vertical cross section) and secondly perpendicularly thereto (horizontal cross section).

If the bottles/pots are used for food or drink, a sterilization step is often advisable. To this end, by way of example, aqueous hydrogen peroxide solution is used for flushing and then the products are dried at 70° C.

The bottles can be further processed by known methods, for example printed, cartonized, or provided with a shrink sleeve. In one inventive embodiment, the container is provided with a shrink sleeve, comprising at least one styrene-butadiene copolymer. These shrink sleeves are described by way of example in WO 06/074819. This permits, product recycling of the bottle together with the shrink sleeve with no need for expensive separation of the sleeve and separate recycling of the components.

As mentioned at an earlier stage above, the inventive bottles/pots are suitable for storage of, for example, whey products, because gas permeability is higher than that of PET. The relatively low density of the inventive bottles moreover gives them a marked advantage over PET bottles. The excellent chemicals resistance of the inventive bottles—in particular with respect to alkaline solutions—also gives them excellent suitability for storage of cosmetic compositions, detergents, and cleaning compositions. On the other hand, for other applications—examples being bottles for mineral water or soft drinks—it can be desirable to produce blow moldings which have a relatively high level of gas barrier properties. Here, blow moldings with an intermediate-layer shell have proven particularly advantageous. Alongside the abovementioned layer composed of polystyrene, the shell has a layer composed of a barrier material, such as polyamide, PET, PBT, PVC, styrene-acrylonitrile copolymers whose acrylonitrile content is more than 50% by weight, or polyvinylidene chloride, or of other barrier plastics known from the literature. To this end, the parison is produced from polystyrene and the barrier material via 2-component injection molding in a known manner and then blown to give a bottle.

Suitable polyamides with excellent gas barrier properties are described by way of example in PCT/EP2006/067471. Bottles produced via 2-component injection molding from polystyrene and the abovementioned polyamide exhibit high gas barriers and are likewise provided by this invention.

EXAMPLES

Characterization of Specimens

Preparation of Transmission Electron Micrographs:

In each case, two sectioned surfaces were prepared from the middle of the container wall, in one instance parallel to the axial direction (vertical cross section) and in one instance perpendicular to the axial direction (horizontal cross section).

The sections were crosslinked/precontrasted in $OsO_4$ vapor and then ultrathin sections of thickness about 80-100 nm were taken at room temperature. The sections were then further contrasted in $OsO_4$ vapor and a transmission electron micrograph was taken by a CCD camera using primary magnification of 2000.

Image Evaluation:

AnalySIS software was used for image evaluation. The digital images were binarized for evaluation and then processed manually. Where necessary, prior to actual measurement, the individual oriented HIPS particles were separated from the actual mixture and sealed.

The aspect ratios of the individual particles were determined on the binary images. The aspect ratio was defined as the maximum height-to-width ratio of a rectangle drawn around the particle. Particles situated at the edge of the image were excluded. The individual values were used for statistical analysis and classified to produce a distribution.

Preparation of Specimens

Polystyrene A: an impact-resistant polystyrene with average molecular weight of 198 000 daltons, polybutadiene content of 7.9%, flowability of 4.4 ml/10 min, modulus of elasticity of 1890 MPa, and yield stress of 25.4 MPa.

Polystyrene B: an impact-resistant polystyrene with average molecular weight of 156 000 daltons, polybutadiene content of 8.0%, flowability of 9.6 ml/10 min, modulus of elasticity of 1980 MPa, and yield stress of 25.9 MPa.

Polystyrene C: an impact-resistant polystyrene with average molecular weight of 193 000 daltons, polybutadiene content of 7.9%, flowability of 4.6 ml/10 min, modulus of elasticity of 1880 MPa, and yield stress of 25.6 MPa, residual styrene content of 65 ppm, total aldehydes content of 2 ppm, and sulfur content of 24 ppm.

Inventive Example 1

Bottles of capacity 1 liter or 0.5 liter were produced at 145° using a blowing pressure somewhat less than 10 bar. The bottles did not split when crushed.

|  | Polystyrene | | |
| --- | --- | --- | --- |
|  | B | A | A |
|  | | Volume | |
|  | 1 liter | 1 liter | 0.5 liter |
| Modulus of elasticity MPa | 2600 | 2700 | 2500 |
| Yield stress MPa | 45 | 52 | 53 |
| Longitudinal aspect ratio (transmission electron micrograph) | 17.8 | 17.4 | 12.0 |
| Transverse aspect ratio (transmission electron micrograph) | 19.6 | 24.6 | 16.0 |
| Biaxial character | 1.10 | 1.41 | 1.33 |

Inventive Example 2

500 ml bottles were produced using 20.5 g of polystyrene A.

Bottle 1 is produced with prestretch speed of 0.4 m/s and with blowing pressure of 1.7 bar. Bottle 2 is produced with prestretch speed of 1.4 m/s and with blowing pressure of 10 bar.

|  | Bottle 1 | Bottle 2 |
| --- | --- | --- |
| Modulus of elasticity | 2800 | 2730 |
| Yield stress | 38 MPa | 45 MPa |
| Ultimate tensile strength | 36 MPa | 42 MPa |
| Tensile strain at yield | 1.9% | 2.3% |
| Transverse aspect ratio (transmission electron micrograph) | 9.9 | 15.3 |
| Longitudinal aspect ratio (transmission electron micrograph) | 7.3 | 13.8 |
| Biaxial character | 1.36 | 1.10 |

Inventive Example 3

Polystyrene B was used to produce a 1 liter bottle at 130° C. with 3 bar of inlet pressure, 10 bar of blowing pressure and prestretch speed of 1.4 m/s. The average thickness of the sidewall was 0.18 mm. The longitudinal and transverse moduli of elasticity were 2610 MPa and 2620 MPa; yield stress was 52 MPa. The aspect ratio in the transmission electron micrograph was 28.5 and 27.8; the value for biaxial character was 1.03.

Comparative Example 4

1 N aqueous NaOH was charged to a 1 liter PET bottle and the inventive bottle from inventive example 3 and the bottles were sealed. The bottles were then loaded with a weight of 3 kg and stored at room temperature for 3 weeks. The inventive polystyrene bottle showed no trace of chemical attack. In contrast, the inner surface of the PET bottle had undergone some degree of swelling and exhibited distinct signs of corrosion.

Inventive Example 5

Polystyrene C was used to produce 1 liter bottles by analogy with inventive example 3. The average thickness of the sidewall was 0.17 mm. The longitudinal and transverse moduli of elasticity were 2880 MPa and 2740 MPa; yield stress was 60 MPa. Fresh milk was charged to the bottles and sensory checks were carried out. Absolutely no impairment of the contents was detected.

Inventive Example 6

A highly transparent, cylindrical bottle composed of SAN (Luran 388 S, BASF Aktiengesellschaft) with volume 500 ml was produced by analogy with inventive example 3. In contrast to PET, it was possible to omit predrying during production of the preform. The blowing pressure required was markedly lower in comparison with an analogous bottle composed of PET: the shaping of the SAN bottle was excellent, with very good vertical orientation. The bottle exhibited excellent resistance to chemicals and fluids such as oils which cause stress cracking.

High-transparency fabric-conditioner bottles (flattened, convex geometry) were moreover produced in 3 different sizes (250 ml, 750 ml and 800 ml) from SAN (Luran 368 R, BASF AG) from a single preform geometry. The weight of the 500 ml SAN bottle was 34.9 g. For comparison: a 500 ml PET bottle produced by analogy with inventive example 6 weighed 40.8 g.

Inventive Example 7

A bottle composed of polystyrene C with volume 480 ml, colored white (using 0.9% by weight of $TiO_2$) was produced by analogy with inventive example 3, using a blowing pressure of about 6 bar. The bottle was additionally sleeved with a shrink sleeve of thickness about 50 μm and width 10.7 cm, composed of Styrolux HS 70. The filled bottle withstood dropping from a height of 1 m, without breaking. The topload demanded was demonstrated by taking a Europallet with bottles and subjecting this to a transport test (truck transport), during which no damage was found.

When a bottled mixed whey product was subjected to sensory and microbiological evaluation, no impairment by the bottle material was found.

Shredded bottles (sleeve and bottle) could easily be subjected to a forming process to give a material with a high level of mechanical properties.

We claim:

1. A blow molding having capacity of at least 250 ml, having a shell which is composed of impact-resistant polystyrene and which is produced via injection stretch blow molding where an average aspect ratio of rubber particles derived from longitudinal section and an average aspect ratio of rubber particles derived from cross section measured in transmission electron micrographs is greater than 4 respectively, and a biaxial orientation of the rubber particles, given by the ratio of the aspect ratio derived from cross section to the aspect ratio derived from longitudinal section is smaller than 3.

2. The blow molding according to claim 1, wherein the shell has less than 30 ppm sulfur content.

3. The blow molding according to claims 1, wherein the shell has also been additionally equipped with a plastic with a barrier property.

4. The blow molding according to claim 3, wherein the plastic with a barrier property comprises polyamide, polyvinylidene chloride or styrene-acrylonitrile copolymers.

5. The blow molding according to claim 1, where the shell has been covered with a shrink film.

6. The blow molding according to claim 5, where the shrink film is composed of a styrene-butadiene block copolymer.

7. A process for production of blow molding according to claim 1, which comprises
   i) melting pellets composed of impact-resistant polystyrene and injection molding said melted pellets to give a parison,
   ii) transferring the resultant parison to a second mold, where it is stretched and blown.

8. The process according to claim 7, wherein the prevailing temperatures in step i) are from 150 to 260° C. and in step ii) are from 120 to 145° C.

9. The process according to claim 7, wherein the preblowing pressure set in step ii) is smaller than 5 bar and the subsequent blowing pressure set is smaller than 15 bar.

10. A process for the storage of dairy products which comprises utilizing the blow molding according to claim 1.

* * * * *